United States Patent [19]
Backderf et al.

[11] 4,026,970
[45] May 31, 1977

[54] OVERPOLYMER RUBBERS AS TOUGHENERS FOR THERMOSET AND THERMOPLASTIC MOLDING COMPOUNDS AND COMPOSITIONS THEREOF

[75] Inventors: Richard Harold Backderf, Richfield; Clifford Dale Guiley, Jr., Medina, both of Ohio

[73] Assignee: The B. F. Goodrich Company, Akron, Ohio

[22] Filed: Nov. 5, 1975

[21] Appl. No.: 628,994

[52] U.S. Cl. .............................. 260/881; 260/879; 260/883; 260/887; 260/897 R; 260/898
[51] Int. Cl.² ...................................... C08F 265/08
[58] Field of Search ........................ 260/881, 883

[56] References Cited

UNITED STATES PATENTS

| | | | |
|---|---|---|---|
| 3,661,994 | 5/1972 | Hwa et al. | 260/879 |
| 3,793,402 | 2/1974 | Owens | 260/876 R |
| 3,833,683 | 9/1974 | Dickie | 260/881 X |

Primary Examiner—William F. Hamrock
Attorney, Agent, or Firm—Alan A. Csontos

[57] ABSTRACT

Overpolymer rubbers comprised of a hard, predominantly arcylonitrile core, a rubbery shell, and a hard overcoat are prepared which have utility as tougheners for thermoset or thermoplastic resin molding compounds.

6 Claims, No Drawings

OVERPOLYMER RUBBERS AS TOUGHENERS FOR THERMOSET AND THERMOPLASTIC MOLDING COMPOUNDS AND COMPOSITIONS THEREOF

BACKGROUND OF THE INVENTION

Overpolymers, prepared by first polymerizing a monomer(s) to a given degree of polymerization and/or particle size to form a core, then polymerizing another monomer(s) over the core to form a shell, are known to the art. The polymerization steps can be carried further to yield yet a third layer called an overcoat, and even fourth layers or more are known. The overpolymer can have hard cores (i.e., high glass transition temperature cores having a Tg value of about 20° C. or higher) or soft cores (i.e., cores having a glass transition temperature of about 0° C. or lower). The glass transition temperatures of the shell and overcoat can alternate with respect to the core such that an overpolymer will be comprised of, for example, a hard core, soft shell, and hard overcoat. Relevant U.S. Pat. Nos. disclosing and teaching the preparation of overpolymers are 3,657,152; 3,661,994; 3,793,402; and 3,803,264.

The overpolymers of the present invention are comprised of a hard predominantly acrylonitrile monomer core, a rubbery shell, and a hard overcoat. These overpolymers have particular utility as tougheners for thermosetting molding compounds such as phenolic resins, furans, epoxy resins, and unsaturated polyester resins, and for thermoplastic molding compounds such as polyvinyl chloride, polycarbonates, polystyrene, polymethacrylates, and polypropylene. Patents directed to the use of overpolymers in thermoset and thermoplastic molding compounds are U.S. Pat. Nos. 3,632,679; 3,655,826; 3,661,994; 3,760,035; 3,793,402; and 3,652,722; 3,787,522; 3,833;682; 3,833,683; 3,880,950; 3,887,645; and 3,894,115. The latter group of patents disclose the use of overpolymers in unsaturated polyester thermoset molding compounds.

SUMMARY OF THE INVENTION

Overpolymers comprised of (1) a hard graft-linked core having a Tg value of over about 20° C. and comprised of predominantly interpolymerized units of acrylonitrile monomer, (2) a crosslinked rubbery shell having a Tg value of below about 0° C, and (3) a hard overcoat having a Tg value of over about 20° C., wherein the weight ratio of the core to the shell to the overcoat ranges from about 1:0.7 to 5:0.4 to 4, and, more preferably, from about 1:0.8 to 2.5:0.5 to 1.5, are useful as tougheners for thermoset and thermoplastic resin molding compounds. Molding compositions prepared using the overpolymers contain from about 0.5 part to about 15 parts by weight of the overpolymer per 100 parts by weight total of the thermoset or thermoplastic resin. In the unsaturated polyester resin molding resin composition, the parts of overpolymer used is based on 100 parts by weight total of polyester resin and vinyl monomer.

DETAILED DESCRIPTION OF THE INVENTION

The overpolymers are prepared using sequential polymerization techniques known to the art. Initial monomer(s) which forms the core of the overpolymer is polymerized to a predetermined degree of conversion or to a particle size. Monomer(s) which forms the shell of the overpolymer is then added to the polymerization, along with additional catalyst and emulsifiers or suspending agents if needed. Polymerization is again continued until a degree of conversion or shell thickness is obtained. Monomer(s) which forms the overcoat of the overpolymer is then added, along with other polymerization ingredients if necessary. The polymerization process is normally conducted continuously in that no shortstop agents or coagulations or the like are used or performed between additions of monomer. The amounts of monomer added in each addition, the degree of conversion of monomers, and the particle size obtained in each increment interact to control the weight ratio of core to shell to overcoat in the overpolymer. The core to shell to overcoat weight ratio is from about 1:0.7 to 5:0.4 to 4, and more preferably, from about 1:0.8 to 2.5:0.5 to 1.5.

The overpolymers can be prepared using an emulsion polymerization process. Temperature of polymerization ranges from about −10° C. to about 100° C., whereas a more preferred range is from about 5° C. to about 80° C. The polymerization can be initiated by free-radical generating agents. Examples of such agents are organic peroxides and hydroperoxides such as benzoyl peroxide, dicumyl peroxide, cumene hydroperoxide, paramenthane hydroperoxide, diisopropylbenzene hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photosensitive agents such as benzophenone, triphenylphosphine, organic diazos, and the like. Typical emulsion polymerization ingredients would include a persulfate salt or organic peroxide and usually a redox system, water adjusted to a desired pH with acids or bases and usually buffered with inorganic salts, and either anionic, cationic, or nonionic surface active agents well known to the art. Patents disclosing sequential polymerization techniques for preparing overpolymers are as follows: U.S. Pat. Nos. 3,291,768; 3,450,796; 3,458,603; 3,502,745; 3,538,194; 3,657,172; 3,661,994; 3,760,035; and 3,793,402.

Core

The monomers employed to prepare the core of the overpolymer are chosen to produce a graft-linked core polymer having a Tg value of above about 20° C. The selection of monomers necessary to prepare a polymer having a given Tg value (glass transition as measured via Differential Thermal analysis) is readily determined by knowing the Tg values of the individual monomers (that are polymerized to homopolymers) and using formulas to calculate weight percents of interpolymerized monomer units (see Nielsen, Mechanical Properties of Polymers, Reinhold Publishing Co., N.Y., N.Y., (1962), page 27).

The core of the overpolymer is comprised of interpolymerized units of from about 50 percent to about 80 percent by weight of acrylonitrile monomer, from about 19 percent to about 40 percent by weight of a copolymerizable vinylidene monomer(s), and from about 0.1 percent to about 10 percent by weight of a graft-linking monomer(s). The weight of the core is from about 10% to about 60% by weight, and preferably from about 25% to about 40% by weight of the total weight of the overpolymer.

The copolymerizable vinylidene monomers used to prepare the core can be any of the known vinylidene monomers such as acrylates and methacrylates like methyl acrylate, ethyl acrylate, n-butyl acrylate, octyl acrylate, dodecyl acrylate, methyl methacrylate, phenyl acrylate, cyclohexyl acrylate, and the like; vinyl acids such as acrylic acid, methacrylic acid, and the like; vinyl esters such as vinyl acetate, vinyl propionate, vinyl butyrate, and the like; vinyl ketones such as methyl vinyl ketone, propyl vinyl ketone, and the like; vinyl ethers such as vinyl methylether, vinyl ethylether, vinyl isobutylether, and the like; vinyl aromatics such as styrene, α-methyl styrene, vinyl toluene, vinyl naphthalene, and the like; dienes such as butadiene, isoprene, 2-isopropyl-1,3-butadiene, and the like; α-monoolefins such as ethylene, propylene, 1-butene, 1-hexane, and the like; vinyl amides such as acrylamide, methacrylamide, N-methyl methacrylamide, diacetone acrylamide, and the like; and hydroxyl-containing vinyl monomers such as β-hydroxyethyl acrylate, α-hydroxypropyl acrylate, 4-hydroxybutyl acrylate, β-hydroxyethyl methacrylate, and the like.

One of the more preferred copolymerizable vinylidene monomers to be used with the acrylonitrile monomer is an acrylate monomer of the formula

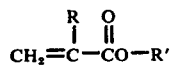

wherein R is H, —CH$_3$, or —C$_2$H$_5$, and R' is an alkyl radical containing 1 to about 24 carbon atoms, or an alkoxyalkyl, alkylthioalkyl, or cyanoalkyl radical containing a total of 2 to about 12 carbon atoms total in the radical. The alkyl structure can be linear or branched. Examples of the acrylates are methyl acrylate, ethyl acrylate, n-propyl acrylate, isopropyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-tetradecyl acrylate, n-octadecyl acrylate, n-eicosyl acrylate, and the like; methyl methacrylate, ethyl methacrylate, n-hexyl methacrylate, n-octyl methacrylate, n-dodecyl methacrylate, n-octadecyl methacrylate, ethyl ethacrylate, n-butyl ethacrylate, and the like; and methoxyethyl acrylate, ethoxyethyl acrylate, butoxyethyl acrylate, ethoxypropyl acrylate, methoxyethyl methacrylate, methylthioethylacrylate, hexylthioethyl acrylate, β-cyanoethyl acrylate, and the like. Mixtures of two or more types of acrylate monomers can be employed.

More preferably, R is hydrogen or methyl and R' is an alkyl radical containing 1 to about 18 carbon atoms or an alkoxyalkyl radical containing 3 to about 8 carbon atoms. Examples of the more preferred monomers are methyl acrylate, ethyl acrylate, n-propyl acrylate, isopropyl acrylate, n-butylacrylate, n-pentyl acrylate, isoamyl acrylate, n-hexyl acrylate, n-octyl acrylate, 2-ethylhexyl acrylate, n-decyl acrylate, n-dodecyl acrylate, n-octadecyl acrylate, methoxyethyl acrylate, ethoxyethyl acrylate, methoxypropyl acrylate, ethoxypropyl acrylate, and the like. Both an alkyl acrylate and an alkoxyalkyl acrylate can be used. Excellent results have been obtained where the copolymerizable vinylidene monomer is an alkyl acrylate wherein R' is a 1 to 4 carbon atom alkyl radical.

The graft-linking monomer can be any material containing at least two olefinic (>C=C<) groups, preferably (H$_2$C=C<) groups. Examples of such monomers are divinyl cyclic hydrocarbons such as divinyl benzene, divinyl naphthalene, divinyl cyclohexane, and the like. However, the preferred graft-linking monomers are those wherein the (<C=C<) groups have different reactivities such that one group will react preferrentially to the other. Examples of these monomers are vinyl and allyl esters of unsaturated carboxylic acids, acid anhydrides, and amides containing 3 to about 10 carbon atoms in the acid, anhydride, or amide. Such monomers are illustrated by vinyl acrylate, vinyl methacrylate, allyl acrylate, allyl methacrylate, diallyl itaconate, the monoallyl and diallyl maleates, the monoallyl and diallyl fumarates, diallyl diglycollate, allyl acrylamide, allyl methacrylamide, allyl crotonate, cinnamyl acrylate, crotyl acrylate, crotyl methacrylate, and the like. Examples of the most preferred monomers are allyl methacrylate, allyl acrylamide, and the like. One or more graft-linking monomers can be employed.

Shell

The shell of the overpolymer is comprised of interpolymerized units of monomers wherein the Tg value is less that about 0° C. The monomer composition of the shell necessary to achieve a given Tg value is readily calculated using known formulas, as described above. The weight of the shell is from about 10% to about 80% by weight, and more preferably from about 20% to about 60% by weight of the overpolymer.

The shell of the polymer must be crosslinked. Hence, of the total interpolymerized monomer content of the shell, from about 0.1% to about 10% by weight of the total weight is comprised of interpolymerized units of a crosslinking monomer. The crosslinking monomer can be any material containing at least two olefinic (>C=C<) groups, preferably (H$_2$C=C<) groups. However, the preferred crosslinking monomers are those wherein the (>C=C<) groups have similar or the same reactivity such that both groups will react in the polymerization. Examples of these monomers are the divinyl cyclic hydrocarbons, monomeric polyesters of a polyhydric alcohol and acrylic or methyacrylic acids containing from 2 to 6 polymerizable acrylic acid groups per polyester molecule, and monomeric polyalkenyl polyethers of polyhydric alcohols containing from 2 to 6 polymerizable alkenyl groups per polyether molecule. The polyhydric alcohol used can contain 2 to about 10 carbon atoms. Examples of such compounds include divinyl benzene, divinyl naphthalene, divinyl cyclohexane, diethylene glycol diacrylate, diethylene glycol dimethacrylate, trimethylene glycol diacrylate and dimethacrylate, butylene glycol diacrylate and dimethacrylate, pentamethylene glycol diacrylate and dimethacrylate, octylene glycol diacrylate and dimethacrylate, glyceryl diacrylate, glyceryl triacrylate, timethylol propane triacrylate, trimethylol propane trimethacrylate, tetraacrylate ester of pentaerythritol, and the like.

The remaining 90% to 99.9% by weight of the total weight of the shell is comprised of interpolymerized units of one or more of the copolymerizable vinylidene monomers as described in the above section (including unsaturated nitrile monomers containing a —CN group and having from 3 to about 8 carbon atoms total in the monomers), with the limitation that the Tg value of the shell is below about 0° C. Preferred monomers used to prepare the shell are (1) acrylate monomers as described above wherein the R group is hydrogen and the R' group is an alkyl radical containing 1 to about 18 carbon atoms or an alkoxyalkyl radical containing 3 to about 8 carbon atoms in the radical, (2) mixtures of a major amount of the acrylate monomer(s) as described above with a minor amount of an unsaturated carboxylic acid(s) containing 3 to about 8 carbon atoms, and (3) mixtures of diene monomers containing from 4 to about 10 carbon atoms and unsaturated nitrile monomers containing from 3 to about 8 carbon atoms, such as butadiene or isoprene and acrylonitrile, where the major monomer is diene. Most preferably, the shell is comprised of a majority of interpolymerized units of the above-defined preferred acrylate monomer(s), particularly those acrylate monomers where R' is an alkyl radical having 4 to about 8 carbon atoms. The acrylate monomes can be copolymerized with acrylic or methacrylic acid in up to 10 parts by weight per 100 parts by weight of the shell monomers.

Overcoat

The overcoat of the overpolymer is comprised of interpolymerized units of monomers wherein the overcoat has a Tg value of over about 20° C. the monomer composition of the shell necessary to achieve a given Tg value is readily calculated using known formulas. The weight of the overcoat is from about 5% to about 70% by weight and more preferably from about 10% to about 45% by weight of the total weight of the overpolymer.

The overcoat does not have to be crosslinked or graft-linked. However, preferably, the overcoat contains from about 0.1% to about 10% by weight based on the weight of the overcoat of interpolymerized units of a monomer(s) containing at least two olefinic (>C=C<) groups. Examples of such monomers are the graft-linking and crosslinking monomers defined in the previous sections. Mixtures of these two types of monomers can be used. The remaining weight percent of the overcoat is comprised of interpolymerized units of a copolymerizable vinylidene monomer(s) such as those employed in the preparation of the core and shell of the overpolymer. The preferred copolymerizable monomer for the overcoat is a vinyl aromatic monomer such as styrene or an unsaturated nitrile monomer such as acrylonitrile. These monomers can be used alone or as mixtures with an acrylate monomer.

The overpolymer can be isolated via coagulation and used in particulate form as a dry, free-flowing powder. Standard coagulation techniques and use of metal salts, solvents, pH adjustment, freeze-agglomeration, and the like, can be used to isolate the overpolymer. The overpolymer can also be spray-dried to a free-flowing powder.

The overpolymers have particular utility as tougheners for thermoset and thermoplastic molding compounds. Examples of thermoset molding compounds are phenolic resins, furans, epoxy resins, and unsaturated polyester resins. Examples of thermoplastic molding compounds are polyvinyl chloride, polycarbonates, polystyrene, polypropylene, and polymethacrylates. The overpolymer is employed in the thermoset or thermoplastic at from about 0.5 part to about 15 parts by weight per 100 parts by weight total of the thermoset or thermoplastic resin. In unsaturated polyester thermoset molding compounds, wherein a vinyl monomer (normally styrene) is also used in the mix, the overpolymer is used in parts by weight based upon the total weight of unsaturated polyester and vinyl monomer.

The overpolymers can be used as tougheners in the form of a latex or as a suspension, in the form of a coating on a filler, or, preferably, in the form of a free-flowing powder. When the overpolymer is coated with a filler, such as calcium carbonate, all or part of the filler can be mixed with the latex with the remaining filler (if any) added in uncoated form.

The overpolymers of the invention were evaluated as tougheners for thermoplastic and thermoset resin molding compositions. Tests conducted on the compositions are as follows. Izod Impact was determined following ASTM D-256. Flexural stress-strain properties were determined following ASTM D-790-71 using a jaw speed of 0.20 inch/minute. A Gardner Impact tester using a falling dart of 1/16 inch radius was used for determining Gardner impact values. Failure was determined by observation of hair line cracks (detected by using red dye) on the reverse side of impact. Hardness was measured using a Barcol Impressor Model No. GYZJ934-1 and reported as the average of three readings. High speed tensile testing was performed on a MTS high speed tester at 250 inches/second at room temperature. Fracture surface energy was determined following the procedure and employing the calculations described by J. P. Berry, *Determination of Fracture Surface Energy By A Cleavage Technique*, in the Journal of Applied Physics, Vol. 34 (1963), p. 62. All tests were performed on ¼ inch thick sample specimens, except for the toughened PVC samples which were ⅛ inch thick samples.

The following examples serve to more fully illustrate the invention.

EXAMPLES

The overpolymers were prepared using a sequential polymerization technique and via an emulsion polymerization process. Unsaturated polyester resin bulk molding compositions were prepared using the overpolymers in the form of a dried latex coating on a filler. The compositions were cured and tested for impact resistance and flexural strength, among other properties. Overpolymers of the invention were also admixed with epoxy resin and polyvinyl chloride resin molding compositions, and the compositions evaluated for their mechanical properties.

Preparation of Overpolymer

An overpolymer having a composition within the scope of the invention was prepared. The polymerization recipe and procedure is as follows. Three monomer mixes were prepared: monomer mix (I) containing 70 parts by weight of acrylonitrile, 27 parts by weight of methyl acrylate, 3 parts by weight of allyl methacrylate, 100 parts by weight of water, 0.5 parts of an alkylbenzene sodium sulfonate as an emulsifier, and 0.5 part of an alkylphenoxy poly(ethyleneoxy) ethanol as an emulsifier; monomer mix (II) containing 94 parts by weight of n-butyl acrylate, 2 parts of acrylic acid, 4 parts of trimethylol propane triacrylate, 90 parts of water, and 0.3 part of the sulfonate emulsifier; and monomer mix (III) containing 97 parts by weight of styrene, 3 parts of divinyl benzene, 100 parts of water, 1 part of the sulfonate emulsifier, and 1 part by weight of the alkylphenoxy poly(ethyleneoxy)ethanol emulsifier. The monomer mixes were added to emulsifier solutions in water.

The addition of ingredients followed a predetermined schedule. 850 grams of water, 0.1 gram of potassium chloride, and 80 grams of monomer mix (I) (representing about 6.5% of the total weight of the monomer mix) were placed into a clean 3-liter reactor vessel equipped for agitation. The reactor vessel was under a nitrogen atmosphere and the contents were stirred throughout the polymerization. The reactor vessel and its contents were heated to 25° C. and 0.3 gram of $Na_2S_2O_4$, 0.06 gram of sodium ferric ethylenediamine tetraacetate, 0.6 gram of sodium formaldehyde sulfoxalate, and 1.2 grams of diisopropylbenzene hydroperoxide were then added. At about 0.5 hour after the hydroperoxide was added, the remaining weight of monomer mix (I) was added by metering it into the vessel over two hours time. At one hour into the polymerization, a catalyst solution of 0.6 gram of sodium formaldehyde sulfoxalate, 0.06 gram of sodium ferric ethylenediaminetetraacetate in 49 milliliters of water, and 1.2 grams of diisopropylbenzene hydroperoxide in 19 milliliters of ethanol were added simultaneously by metering the catalyst solutions into the reactor vessel over a period of 5½ hours. After monomer mix (I) was totally added, monomer mix (II) was added by metering it into the vessel over 2 hours time. Once 100 milliliters of monomer mix (II) was added, an additional 24.3 grams of the sulfonate emulsifier (as a solution in water) was added to the remainder of monomer mix (II) yet to be added. After all of monomer mix (II) was added, the temperature of the reactor vessel and contents was raised to 45° C. and monomer mix (III) was then added by metering it into the vessel over a period of one hour. At the end of the additions, the temperature was kept at 45° C. and the vessel contents stirred for three hours. Final latex particle size was about 1500 A. Total conversion of monomers to polymer was above 95 percent by weight. The core to shell to overcoat weight ratio is about 1:1.5:0.5 for the overpolymer.

Following the same or similar polymerization techniques, other overpolymers having different core, shell and/or overcoat compositions or weight ratios of core to shell to overcoat were prepared. All of the overpolymers were solid materials (when isolated from the latex). The overpolymers were evaluated as tougheners for unsaturated polyester resins.

Preparation of Molding Compositions

The unsaturated polyester resin used in the polyester resin molding composition evaluations is an isophthalic type resin having an acid value of 15 to 30, a specific gravity of 1.12 ± 0.01, a viscosity at 25° C. of 1600 to 1900 centipoise. The material is sold commercially by PPG Industries as Selectron 50239. The resin mix contains about 35% by weight of styrene as a polymerizable vinyl monomer. Other ingredients used in the evaluation include zinc stearate, calcium carbonate having an average size of about 0.2 micron and an oil absorption of 21 pounds/100 pounds, t-butyl perbenzoate used as the resin mix catalyst, and one-fourth inch chopped glass strand (when used).

The overpolymers were admixed with the other ingredients in the unsaturated polyester resin compositions by (a) admixing all of the overpolymer in latex form with all of the calcium carbonate, (b) admixing the overpolymer in latex form with equal parts by weight of calcium carbonate (a 1 to 1 mix), or (c) admixing the overpolymer in latex form with the calcium carbonate at a 1 part to 2 part ratio (a 1 to 2 mix). Calcium carbonate not mixed with the overpolymer latex, if any, was used as is in the compositions. The weight of overpolymmer used in the thermoset resin compositions varied from 0 to 24 parts by weight to 100 parts by weight of the resin mix in the composition. Mixing of ingredients was performed using a Bekin sigmoid-type mixer rotating at 16/32 rpms. The unsaturated polyester resin mix (containing the styrene) was added first to the mixer, followed by the t-butyl perbenzoate catalyst, the overpolymer coated calcium carbonate, remaining calcium carbonate, and the chopped glass. Mixing was done at 25° C. Total mix time was about 15 to 20 minutes. The typical form of the thermoset resin composition was a thick paste. The thermoset resin composition was then placed into a 6 inches by 9 inches by ¼ inch mold (6 inches by 3 inches by 174 inch for Gardner impact samples) and then cured for 2 minutes at 150° C. under pressure using a hydraulic press. Test specimens were prepared from the cured compositions.

The epoxy resin molding compositions were prepared by admixing the epoxy resin and curative ingredients with the overpolymer in latex form, drying off the water from the latex, and then curing the mix.

Molding compositions of thermoplastic polymers such as polyvinyl chloride are prepared by admixing the thermoplastic polymer (and compounding ingredients if used) with the overpolymer in dry powder form. The mixture is then mixed on a two-roll mill or in a mixing kettle or extruder and molded under temperature and pressure.

EXAMPLE I

An overpolymer was prepared having the composition: core: 70% acrylonitrile, 27% methyl acrylate, 3% allyl methacrylate; shell: 94% n-butyl acrylate, 2% acrylic acid, 4% trimethylol propane triacrylate; and overcoat: 97% styrene and 3% divinyl benzene. The core to shell to overcoat weight ratio of the overpolymer is 1:1.5:0.5. The overpolymer was admixed into a filled unsaturated polyester resin composition at various levels of overpolymer per 100 parts by weight of the unsaturated polyester resin mix.

The exact preparation of the unsaturated polyester resin composition used in the Example follows. The overpolymer in latex form was added in the appropriate parts by weight of overpolymer solids to calcium carbonate ($CaCO_3$) in a mixing kettle. The $CaCo_3$ is present in two times the parts by weight of overpolymer used. The overpolymer and $CaCo_3$ were mixed at 25° C. and the water from the latex removed by drying under reduced pressure. The overpolymer coated $CaCO_3$ was then added to 100 parts by weight of the unsaturated polyester resin mix (sold commercially as Selectron 50239 by PPG Industries) and the mixture combined with the catalyst, t-butyl peroxide, and zinc stearate. The admixture was stirred for 5 minutes and the remainder of the $CaCO_3$ then added. After 5 more minutes of mixing, chopping glass fiber (¼ inch length) were added and the total mix stirred for 4 minutes. The mix was then placed into 6 inches × 9 inches × ¼ inch molds and cured at 150° C. for 2 minutes. Tests run were Izod impact and reverse Gardner, hardness, flexural stress and strain, and flexural modulus. The recipes employed (in parts by weight) and results obtained are as follows:

|  | Control | 1 | 2 | 3 | 4 |
|---|---|---|---|---|---|
| Selectron 50239 | 100 | 100 | 100 | 100 | 100 |
| CaCO₃ | 200 | 200 | 200 | 200 | 200 |
| Zinc Stearate | 5 | 5 | 5 | 5 | 5 |
| t-Butyl Peroxide | 1.5 | 1.5 | 1.5 | 1.5 | 1.5 |
| Chopped Glass Fibers | 100 | 100 | 100 | 100 | 100 |
| Overpolymer | 0 | 3 | 6 | 8 | 24 |
| Izod Impact (notched, ft. lbs./inch notch) | 4.4 | 6.2 | 4.7 | 4.9 | 5.5 |
| Reverse Gardner Impact (pass/fail, in. lbs. | 1/2 | 2/3 | 3/4 | 3/4 | 5/6 |
| Flexural Stress, psi | 7500 | 13000 | 12400 | 13800 | 15600 |
| Flexural Strain, percent | 0.7 | 1.1 | 1.0 | 1.2 | 1.5 |
| Flexural Modulus, kpsi | 1600 | 1810 | 1790 | 1770 | 1510 |
| Barcol Hardness | 72 | 70 | 68 | 65 | 55 |

The data shows an improvement in properties obtained using the unique overpolymer in the unsaturated polyester resin composition. The Izod impact, reverse Gardner impact, and Flexural stress and modulus improved for each of the sample compositions without any decrease in flex modulus until the level of overpolymer employed (24 parts in sample 4) is above that disclosed in the specification as the useful range.

An overpolymer substantially identical to that prepared above (but for a core of 70% acrylonitrile, 28% methyl acrylate, and only 2% by weight allyl methacrylate) was used in the same recipe as above at a level of 3 parts by weight per 100 parts of polyester resin mix. The test results on evaluation were 6.1 Izod impact, 3 in.-lbs. (pass) on reverse Gardner impact, 12600 psi flexural stress, 1.1 percent flexural strain, and 1830 kpsi flexural modulus.

EXAMPLE II

An overpolymer was prepared having a core to shell to overcoat weight ratio of 1:1.3:0.53 and a composition of core: 70% acrylonitrile, 29% methyl acrylate, 1% allyl methacrylate; shell: 66% butadiene, 33% acrylonitrile, 1% divinylbenzene; and overcoat: 97% styrene and 3% divinylbenzene. The overpolymer is similar to that used in Example I but for the rubbery shell which in this case is butadiene and acrylonitrile rather than n-butyl acrylate. The overpolymer was mixed into an unsaturated polyester resin composition following the procedure and recipe in Example I. The results given below show the cured compositions having improved properties.

|  | Control | 1 | 2 | 3 |
|---|---|---|---|---|
| Overpolymer, parts | 0 | 3 | 6 | 12 |
| Izod Impact (ft. lbs./inch notch) | 4.4 | 4.7 | 4.5 | 5.2 |
| Reverse Gardner Impact, in.-lbs. (pass/fail) | 1/2 | 2/3 | 3/4 | 4/5 |
| Flexural Stress, psi | 7500 | 15100 | 12900 | 11800 |
| Flexural Strain, percent | 0.7 | 1.4 | 1.1 | 1.1 |
| Flexural Modulus, kpsi | 1600 | 1770 | 1780 | 1640 |

EXAMPLE III

The previous example was directed to the use of an overpolymer having a variation in the composition of the rubbery shell. This example is directed to the use of an overpolymer having a variation in the composition of the overcoat. The overpolymer has a core to shell to overcoat weight ratio of 1:1.5:0.5 and a composition of core: 70% acrylonitrile, 29% methyl acrylate, 1% allyl methacrylate; shell: 94% n-butyl acrylate, 2% acrylic acid, 4% trimethylol propane triacrylate; and overcoat: 70% acrylonitrile, 29% methyl acrylate, and 1% allyl methacrylate. The overpolymer is similar to that used in Example I but for the predominantly acrylonitrile overcoat in place of a styrene overcoat.

The acrylonitrile overcoated overpolymer was admixed into an unsaturated polyester resin molding composition following the procedures and according to the recipe in Example I. The cured vulcanizates were evaluated and the test results reported below.

|  | Control | 1 | 2 | 3 |
|---|---|---|---|---|
| Overpolymer, parts | 0 | 3 | 6 | 12 |
| Izod Impact (ft. lbs./inch notch) | 4.4 | 5.7 | 5.2 | 4.6 |
| Reverse Gardner Impact, in.-lbs. (pass/fail) | 1/2 | 4/5 | 5/6 | 6/7 |
| Flexural Stress, psi | 7500 | 12000 | 17600 | 13300 |
| Flexural Strain, percent | 0.7 | 0.9 | 1.4 | 1.2 |
| Flexural Modulus, kpsi | 1600 | 1840 | 1870 | 1620 |

EXAMPLE IV

A change in the weight ratio of core to shell to overcoat in the overpolymer can be made within the limits disclosed. The overpolymer in Example I has a weight ratio of 1:1.5:0.5; the core being ⅓ by weight of the overpolymer, the shell being ½ of the overpolymer, and the overcoat being 1/6 of the overpolymer. An overpolymer having the same interpolymerized monomer composition as that of Example I, but having a 1:1:1 weight ratio (core, shell, and overcoat each being ⅓ by weight of the overpolymer) was prepared and evaluated. The recipes and procedure of Example I were employed.

|  | Control | 1 | 2 |
|---|---|---|---|
| Overpolymer, parts | 0 | 2 | 4 |
| Izod Impact (ft. lbs./inch notch) | 4.4 | 4.9 | 5.6 |
| Reverse Gardner Impact, in.-lbs. (pass/fail) | 1/2 | 3/4 | 3/4 |
| Flexural Stress, psi | 7500 | 11500 | 11700 |
| Flexural Strain, percent | 0.7 | 1.0 | 1.0 |
| Flexural Modulus, psi | 1600 | 1780 | 1790 |

EXAMPLE V

The overpolymer of the invention is comprised of a hard core, a rubbery shell, and a hard overcoat. If an overpolymer having a soft, rubbery core is used, lower Izod impact and flexural modulus are obtained. The overpolymer and unsaturated polyester resin composition shown in Example I as sample 1 exhibited an Izod impact value of 6.2 and a flexural modulus of 1810 psi. An overpolymer having a core of 97% n-butyl acrylate, 2% acrylic acid, 4% trimethylolpropane triacrylate and a shell of 97% styrene and 3% divinylbenzene was used to prepare a composition similar to that of sample 1 above. The composition prepared using the soft core polymer exhibited an Izod impact value of 4.1 and a flexural modulus of 1690 psi. The second overpolymer (soft core polymer) is dissimilar to that of the overpolymer in Example I in that the overpolymer of the invention has a hard acrylonitrile core and the other overpolymer of this example has a soft core or no core; i.e., it can be described as a 0:1.5:0.5 overpolymer without a hard core.

EXAMPLE VI

An overpolymer was prepared having no crosslinking in the core, shell, and overcoat. When mixing this overpolymer latex with the $CaCO_3$ and other polyester resin composition ingredients, the latex coagulated and formed rubbery films. The overpolymer would not disperse in the polyester resin mix, and no toughened cured compositions could be prepared.

EXAMPLE VII

The overpolymer of Example I was admixed at 3 parts by weight per 100 parts by weight of a difunctional thermoset epoxy resin molding compound and an amine curative for the epoxy resin. As the overpolymer was used in latex form, after mixing the mixture was placed under reduced pressure to evaporate off the water from the latex. The composition was then poured into a mold and cured for 16 hours at 120° C. A control composition was prepared without using any overpolymer. Results of the tests on the cured compositions show that the use of the overpolymers of the invention significantly increase the impact strength of thermoset epoxy resin molding compounds.

|  | Overpolymer | Control |
|---|---|---|
| Epon 828 | 100 | 100 |
| Overpolymer | 3 | — |
| Piperidine | 5 | 5 |
| Gardner Impact, inch-pounds (pass) | 63 | 50 |
| Fracture Surface Energy, in.-lbs./in.² | 14.1 | 1.0 |

EXAMPLE VIII

Overpolymers of the invention were admixed with polyvinyl chloride homopolymer and the molding composition was evaluated for its impact properties. The overpolymers employed were Overpolymer A: a core of 70% acrylonitrile, 28% methyl acrylate, and 2% allyl methacrylate, a shell of 94% n-butyl acrylate, 2% acrylic acid, and 4% trimethylol propane triacrylate, and an overcoat of 97% styrene and 3% divinyl benzene and Overpolymer B: a core of 70% acrylonitrile, 29% methyl acrylate, and 1% allyl methacrylate, a shell of 94% n-butyl acrylate, 2% acrylic acid, and 4% trimethylol propane triacrylate, and an overcoat of 70% acrylonitrile, 29% methyl acrylate, and 1% allyl methacrylate. Both overpolymers had a core to shell to overcoat weight ratio of 1:1.5:0.5. The PVC homopolymer, in powder form, and the overpolymer, in powder form, were admixed in a mixing kettle along with processing aids, a pigment, and a stabilizer according to the recipes (in parts by weight) given below.

The compositions were then mixed on a two-roll mill at a temperature of 350° F. for 5 minutes, sheeted off, and test samples press-molded at 390° F. for 3 minutes.

Izod impact data was obtained on the prepared samples. The results given in the following table show that the use of the overpolymers of the invention increase the impact strength of PVC.

|  | 1 | 2 | 3 |
|---|---|---|---|
| PVC Homopolymer | 100 | 100 | 100 |
| Overpolymer A | — | 12 | — |
| Overpolymer B | — | — | 12 |
| $TiO_2$ | 5 | 5 | 5 |
| Calcium Stearate | 2 | 2 | 2 |
| Processing Aid | 2 | 2 | 2 |
| Dibutyltin bis(isooctylthioglycolate) | 2 | 2 | 2 |
| Izod Impact[a], ft.-lbs./inch/notch | 0.9 | 2.2 | 1.4 |

We claim:

1. An overpolymer comprised of (1) a hard graft-linked core having a Tg value of over about 20° C. and comprised of interpolymerized unit of from about 50 percent to about 80 percent by weight of acrylonitrile, from about 19 percent to about 40 percent by weight of an acrylate monomer(s) of the formula

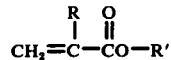

wherein R is hydrogen, methyl, or ethyl, and R' is an alkyl radical containing 1 to about 24 carbon atoms or an alkoxyalkyl, alkylthioalkyl, or cyanoalkyl radical containing a total of 1 to about 12 carbon atoms in the radical and from about 0.1 percent to about 10 percent by weight of a graft-linking monomer which is a vinyl or allyl ester of a member selected from the group consisting of an unsaturated acid, unsaturated acid anhydride, and an unsaturated amide each of which contains from 3 to about 10 carbon atoms (2) a cross-linked rubbery shell having a Tg value of below about 0° C. containing from about 0.1 percent to about 10 percent by weight based on the total weight of the shell of a crosslinking monomer wherein the shell contains interpolymerized units of from about 90 percent to about 99.9 percent by weight based on the total weight of the shell of interpolymerized units of a mixture of a major amount of an acrylate monomer of the formula

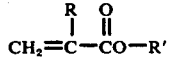

wherein R and R' are defined as above, with a minor amount of an unsaturated carboxylic acid containing 3 to about 8 carbon atoms, and the crosslinking monomer is selected from the group consisting of divinyl cyclic hydrocarbons, monomeric polyesters of a polyhydric alcohol containing 2 to about 10 carbon atoms with acrylic or methacrylic acid, and monomeric polyalkenyl polyethers of a polyhydric alcohol containing 2 to about 10 carbon atoms, and (3) a hard overcoat having a Tg value of over about 20° C.; said core, shell, and overcoat present in a weight ratio of from about 1:0.7 to 5.0:0.4 to 4.0 based on the core.

2. An overpolymer of claim 1 where in (1) the copolymerizable vinylidene monomer is an acrylate monomer(s) wherein R is hydrogen and R' is an alkyl radical containing 1 to about 18 carbon atoms or an alkoxyalkyl radical containing 3 to about 8 carbon atoms total in the radical and the graft-link monomer(s) is selected from the group consisting of vinyl acrylate and methacrylate, allyl acrylate and methacrylate, allyl and diallyl maleate, allyl and diallyl fumarate, diallyl glycollate, allyl acrylamide and methacrylamide, allyl crotonate, cinnamyl acrylate, and crotyl acrylate and methacrylate.

3. An overpolymer of claim 2 where in (2) the shell contains a mixture of a major amount of the above-defined acrylate monomer with acrylic or methacrylic acid, and the crosslinking monomer(s) is selected from the group consisting of divinyl benzene, divinyl naphthalene, divinyl cyclohexane, diethylene glycol diacrylate and dimethacrylate, butylene glycol diacrylate and dimethacrylate, pentamethylene glycol diacrylate and dimethacrylate, octylene glycol diacrylate and dimethacrylate, glyceryl diacrylate and triacrylate, trimethylol propane triacrylate and trimethacrylate, and the tetraacrylate ester of pentaerythritol.

4. An overpolymer of claim 3 where in (1) the acrylate monomer has R' as an alkyl radical having 1 to 4 carbon atoms, in (2) the acrylate monomer has R' as an alkyl radical having 4 to 8 carbon atoms, and the weight ratio of core to shell to overcoat in the overpolymer is from about 1:0.8 to 2.5:0.5 to 1.5.

5. An overpolymer of claim 4 comprising (1) a core of interpolymerized units of about 70 percent by weight of acrylonitrile, about 27 percent by weight of methyl acrylate, and about 3 percent by weight of methyl acrylate, and about 3 percent by weight of allyl methacrylate, (2) a shell of interpolymerized units of about 94 percent by weight of n-butyl acrylate, about 2 percent by weight of acrylic acid, and about 4 percent by weight of trimethylol propane triacrylate, and (3) an overcoat of interpolymerized units of about 97 percent by weight of styrene and about 3 percent by weight of divinyl benzene.

6. An overpolymer of claim 4 comprising (1) a core of interpolymerized units of about 70 percent by weight of acrylonitrile, about 29 percent by weight of methyl acrylate, and about 1 percent by weight of allyl methacrylate, (2) a shell of about 94 percent by weight of n-butyl acrylate, about 2 percent by weight of acrylic acid and about 4 percent by weight of trimethylol propane triacrylate, and (3) an overcoat of about 70 percent by weight of acrylonitrile, about 29 percent by weight of methyl acrylate, and about 1 percent by weight of allyl methacrylate.

* * * * *